March 3, 1936.  A. PAMPINELLA  2,033,000
DAVIT FOR LIFEBOATS
Filed Nov. 8, 1934  7 Sheets-Sheet 1
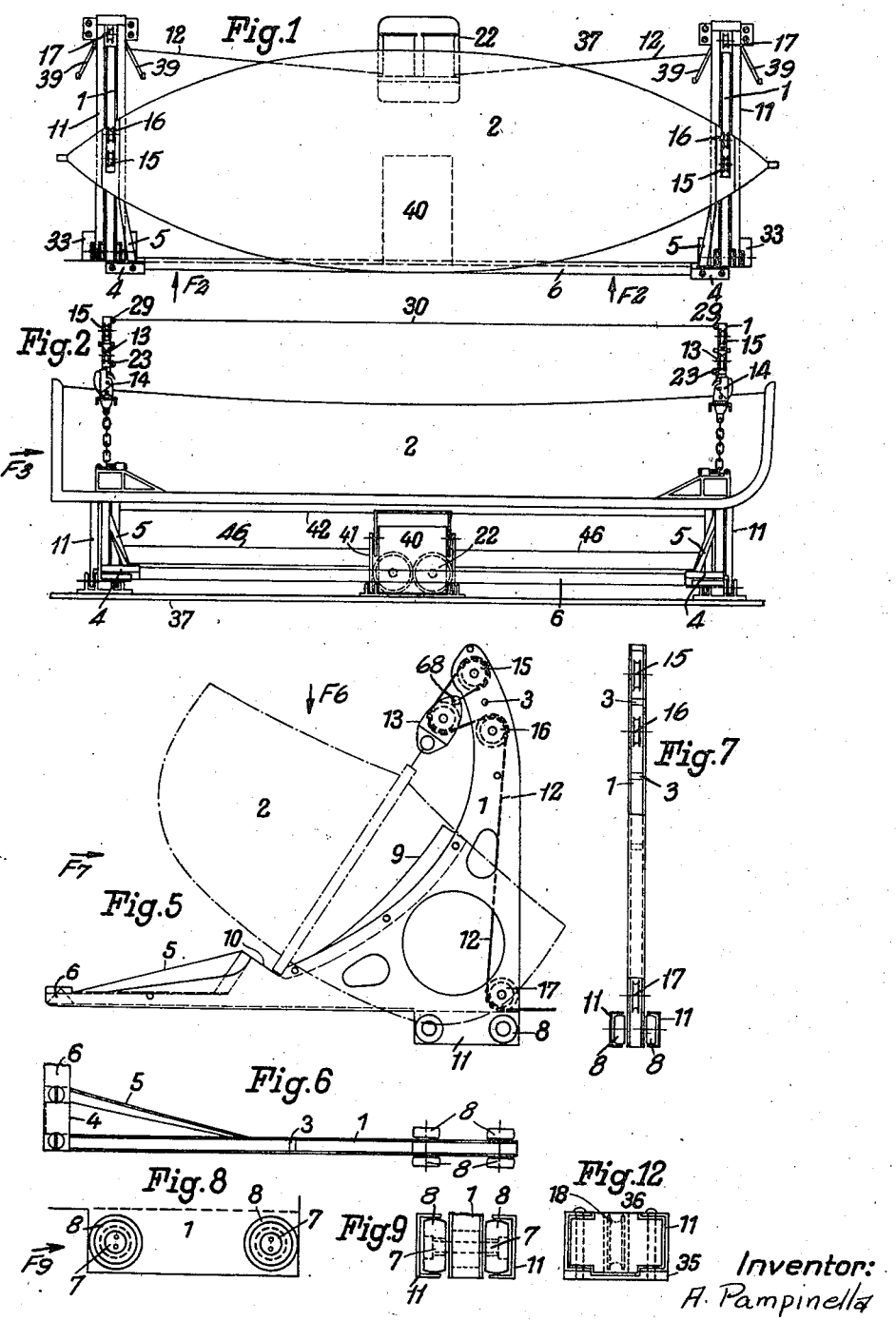
Inventor:
A. Pampinella
By Glascock Downing Leefold
Attys.

March 3, 1936.　　A. PAMPINELLA　　2,033,000
DAVIT FOR LIFEBOATS
Filed Nov. 8, 1934　　7 Sheets-Sheet 2
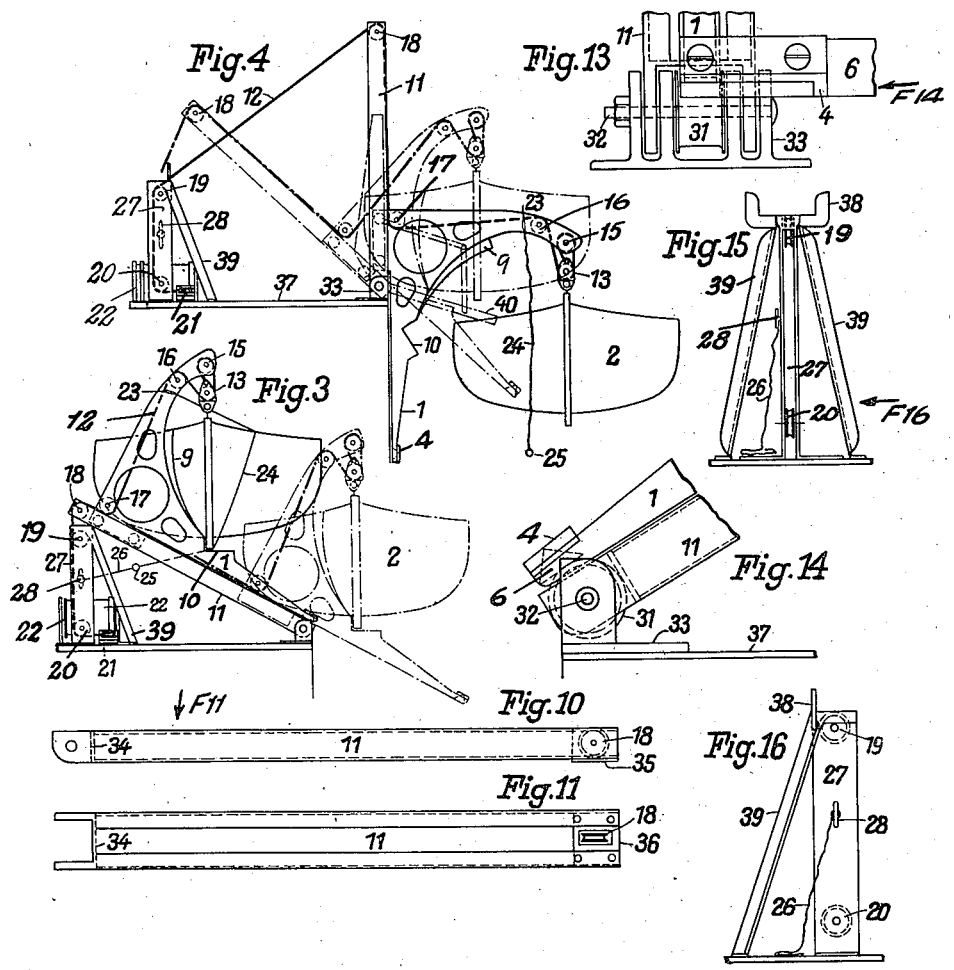
Inventor:
A. Pampinella
By Glascock Downing & Seebold
Attys.

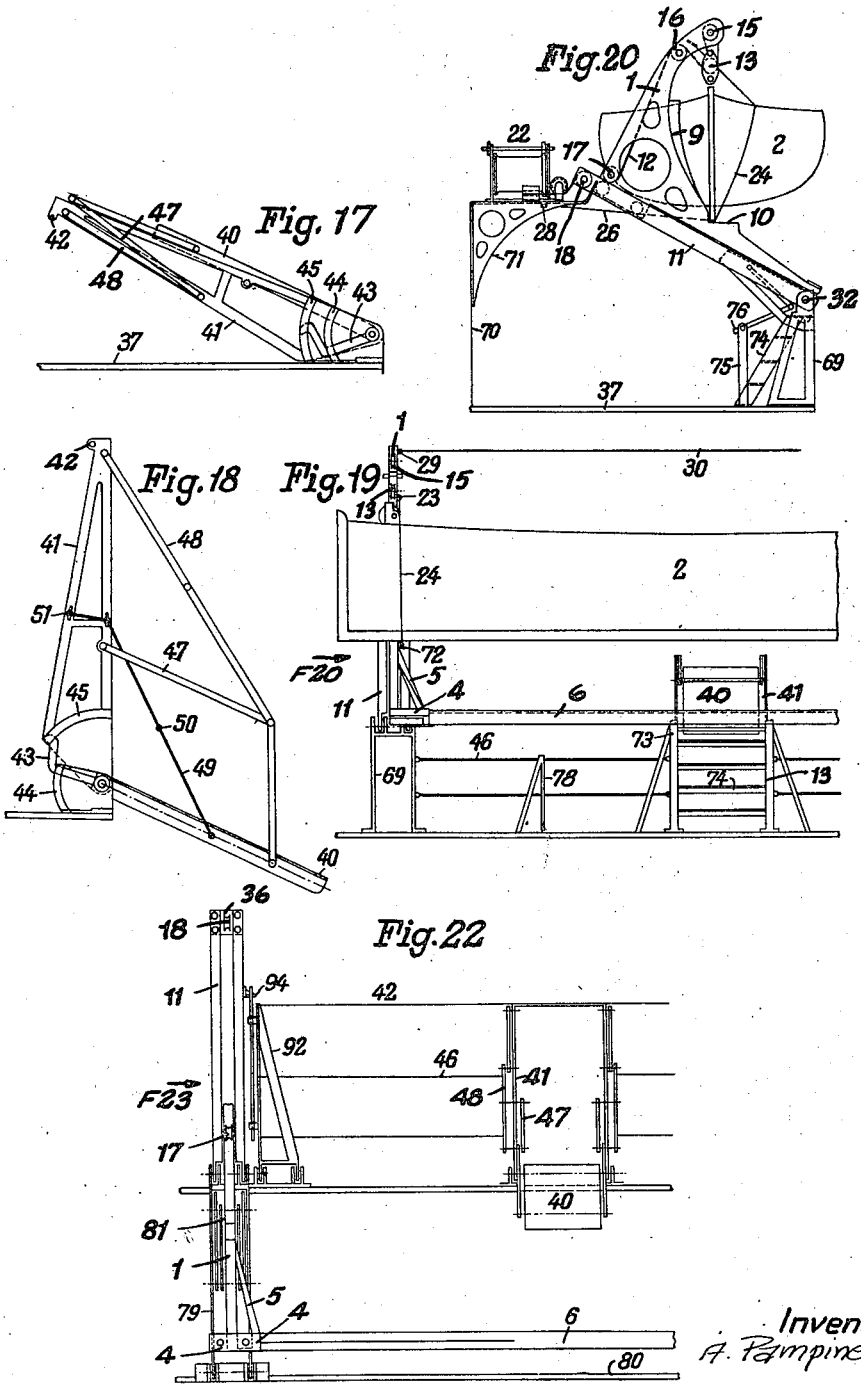

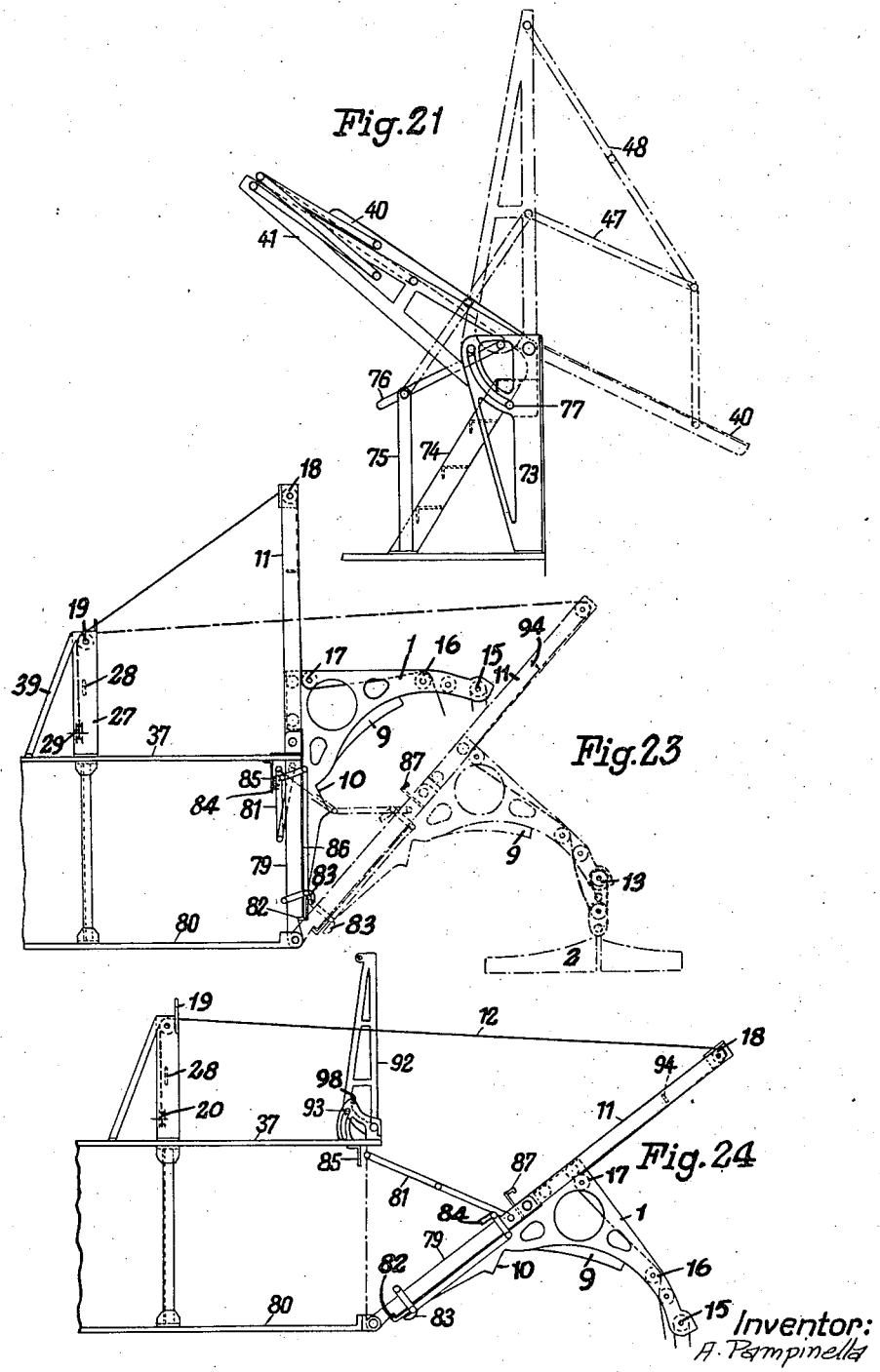

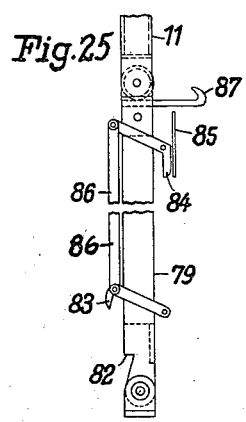
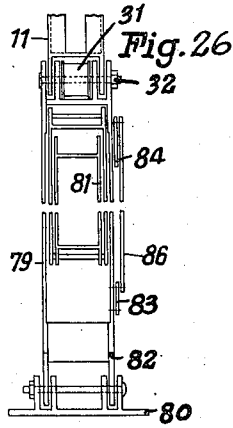
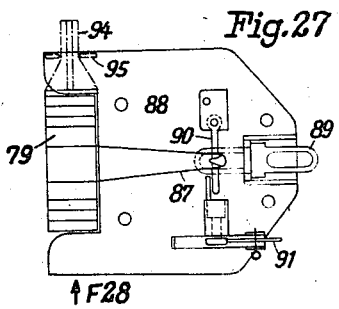
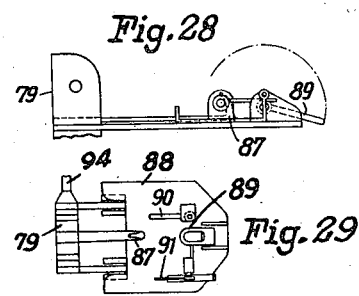
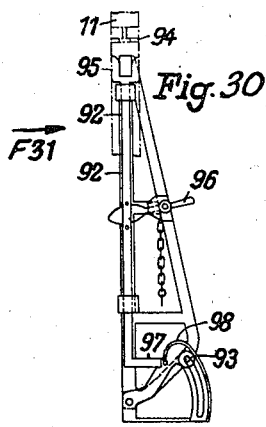
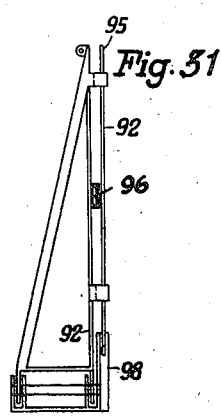

March 3, 1936.  A. PAMPINELLA  2,033,000
DAVIT FOR LIFEBOATS
Filed Nov. 8, 1934  7 Sheets-Sheet 6

Inventor:
A. Pampinella

By Glascock Downing & Seebold
Attys.

March 3, 1936.  A. PAMPINELLA  2,033,000
DAVIT FOR LIFEBOATS
Filed Nov. 8, 1934  7 Sheets-Sheet 7

Inventor:
A. Pampinella
By Glascock Downing Seebold
Attys.

Patented Mar. 3, 1936

2,033,000

UNITED STATES PATENT OFFICE 2,033,000

DAVIT FOR LIFEBOATS

Antonino Pampinella, Rome, Italy

Application November 8, 1934, Serial No. 752,160
In Italy November 10, 1933

12 Claims. (Cl. 9—22)

This invention relates to a new type of automatic davits which provide for a quick, easy and sure means of lowering launches, also in the case of the ship having a list to the opposite side of launches.

The device is substantially formed by a couple of davits which first slide on guides forming an inclined plane, and afterwards, together with these guides, tip over, swinging the launch outboard; on this a gang-board is automatically disposed, allowing for an easy and safe way of embarking the passengers; the launch is then lowered, and as soon as it floats, it becomes unhooked from the tackles and is free to sail away.

All the above mentioned movements take place automatically by gravity, that is, simply owing to the weight of the launch, just veering away the falls, and for the whole operation only one person is needed.

In the accompanying drawings, showing by way of example some preferred embodiments of the invention:

Fig. 1 is a plan view of a first embodiment of the davits according to the invention;

Fig. 2 is a front elevation of the same looking in the direction of the arrows F2;

Fig. 3 is a side elevation of the same looking to Fig. 2 in the direction of the arrow F3, the dotted lines showing the davits while slipping outwards;

Fig. 4 shows the davits of Fig. 3 after their slipping and tipping movements, the dotted lines showing their initial position. In this view is also shown the gang-board automatically disposed on the launch by the tipping up of the guides.

Fig. 5 is an enlarged side view of a davit arm;

Fig. 6 shows the davit arm looked at in the direction of the arrow F6 of Fig. 5;

Fig. 7 shows the said davit looked at in the direction of the arrow F7 of Fig. 5;

Fig. 8 is a detail view of the carriage of the davit arm;

Fig. 9 is a view of said carriage looked at in the direction F9 of Fig. 8, together with the guides of the davit arm;

Fig. 10 is a side view of the guiding girder of a davit arm, and

Fig. 11 shows the same guiding girder looked at in the direction of the arrow F11 of Fig. 10;

Fig. 12 is a detail view of the member that closes the top end of the guiding girder;

Fig. 13 is a detail view showing the way in which the guiding girder is pivotally fixed on the boat's deck;

Fig. 14 is a view of same, looked at in the direction of arrow F14 of Fig. 13;

Fig. 15 is a front view of the girder supporting means;

Fig. 16 is a view of the same supporting means looked at in the direction of the arrow F16 of Fig. 15;

Fig. 17 is a side view of the gang-board together with its movable frame;

Fig. 18 is a view showing the gang-board and its frame in their working position;

Fig. 19 is a front view of another embodiment of the davits according to the invention;

Fig. 20 is a side view of the davits of Fig. 18 looking at this figure in the direction F20, of Fig. 19;

Fig. 21 is a detail view of the gang-board and its associated parts, as adapted to be used in connection with the davits represented in Figures 19 and 20;

Fig. 22 is a front view of another embodiment of the davits according to the invention in which the davits are shown in the position they have after the first tipping movement;

Fig. 23 shows in full lines the davits of Fig. 22 looked at in the direction F23 of Fig. 22, the dotted lines showing the same davits in an intermediate position between Fig. 23 and Fig. 24 positions;

Fig. 24 shows the davits of Figs. 22 and 23 in their working position;

Fig. 25 is a fragmentary enlarged side view of a beam for the above said davits;

Fig. 26 is a fragmentary front view of the beam shown in Fig. 25;

Fig. 27 is a plan view of the means for fastening the said beam to the deck;

Fig. 28 shows the said fastening means looked at in the direction of the arrow F28 of Fig. 27;

Fig. 29 shows in a reduced scale the same parts as Fig. 27 in the position they have when the beam has been released;

Fig. 30 shows one of the movable stanchions used in connection with the davits shown in Figures 22—24;

Fig. 31 shows the same stanchion looked at in the direction F31 of Fig. 30;

Figure 32:
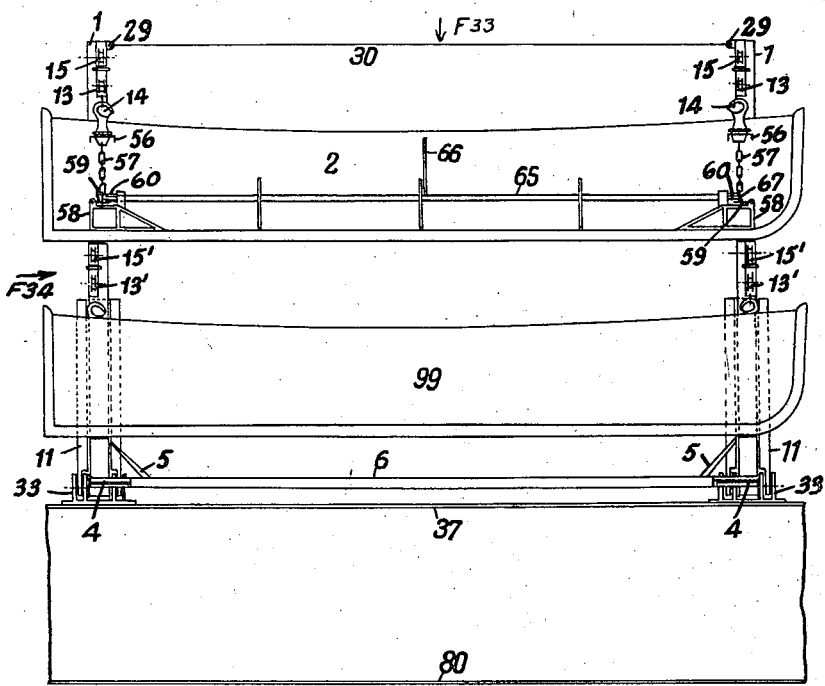
Fig. 32 is a front view of a type of davit according to the invention, for two boats.

As shown in Figs. 1 to 16, the device includes a couple of davits (Figs. 1-4), each formed by an arm 1 (Fig. 5) made of two iron plates suitably perforated for lightness, and so shaped as to fit the side of the launch 2 (Figs. 3-5). The two plates are joined at bottom and at back by a connecting strip of plate and are fastened together by bolts 3 (Figs. 5-7) which keep them conveniently apart so as to lodge between them the pulleys for the hoisting rope.

At the bottom end of the davit is fixed a piece 4 (Figs. 6, 13) strengthened by struts 5 (Figs. 5, 6). On piece 4 is fastened by means of screws a transversal bar 6 (Figs. 2, 5, 6, 13) which conects the two davits to render them rigid and prevent any oscillation due to the pitching of the ship when, the lashings being loosened the whole weight of launch is applied to the head of the davits.

This bar 6 is preferably hollow and has a triangular cross section (Figs. 5, 14), the projecting edge being chamfered in the middle portion of the bar (Fig. 22) so that the launch may easily slip thereon when the ship is listed.

The base of each davit, on its inboard end, carries, perpendicularly to its vertical plane, two protruding pivots 7 (Figs. 8, 9) with tapped holes at the ends, which serve as axles to the rollers 8 (Figs. 5, 8, 9) which are provided on their outer face with a circular depression (Fig. 9) in which is lodged the stop screw fixed in the tapped hole on the associated pivot.

When the launch is in position of rest, the contact between it and the davit is made through a wooden piece 9 (Figs. 3-5) fixed on the curved portion of the davit, which has a shoulder 10 to receive the keel of the launch when this is shipped. This shoulder is also to act as a stop for the launch when the same is lowered with the ship listed to the opposite side, and precisely during the sliding movement of davits on the guides 11, as in this phase the tackles would tend to slacken due to the said list. Such slackening of tackles is prevented by the launch going to rest on the aforementioned shoulders, and this is what allows for the sliding of davits even when the ship is unfavourably listed. In this condition, at a certain moment of the tipping over movement of the davits, the fall becomes again taut, and the launch is brought up close to the ends of the davits.

The end of the steel hoisting cable 12 is fixed on the running block 13 (Figs. 4-5), which carries a ring for engagement with the suspension hook 14 of the launch (Fig. 2), then passes over the pulleys 15, 13, 16, and 17 (carried by the davit) 18 (on the head of girder), 19, 20 (on the support of the girder), 21 (on the deck) and finally is wound over the winch drum 22 (Figs. 3, 5).

On the upper portion of each davit are fixed two eye bolts (Figs. 3, 26); to the eye bolt 23 is fixed the end of cable 24 which is provided to lash the launch against the davit and this to its support. For this purpose the lashing 24 carries on its free end a ring 25 (Figs. 3, 4) through which the stop rope 26 (Figs. 3, 16), one end of which is fixed on support 27 is made to pass once or more times being finally fastened to cleat 28 (Figs. 3, 16).

To the other eye bolt 29 (Figs. 2, 19) is fixed the steel cable 30 which, besides helping to join the two davits serves to support the tilt of the launch and carries the life lines.

The davit I have described slides owing to gravity on the supporting girder 11 (Figs. 3, 7, 9, 13) by means of its posterior truck formed by the two already mentioned pair of rollers 8 (Figs. 5, 8, 9) and roller 31 revolving on pin 32 which hinges the aforesaid girder 11 on base 33. To obtain such sliding motion, the girder is normally inclined outboard at 30° (Fig. 3), and is formed as follows:

Two iron guides whose cross section is U-shaped are held together, at a proper distance, at the front by an internal plate 34 (Figs. 10, 11), which serves as a stop for the truck at the end of the sliding movement of davit, and at the back by an external transversal plate 35 fastened under the guides, leaving open the ends of same for introducing the above mentioned truck of the davit when assembling the device.

Having introduced the truck, the box shaped piece 36 (Figs. 11, 12) is fixed in place by four screws which afford strength to the girder. This box shaped piece carries pulley 18.

The girder is hinged on base 33 (Figs. 4, 13, 14) which is fixed on the edge of the boats deck 37, and its inboard end rests on support 27 (Fig. 3) the height of which is such as to maintain the girder inclined at 30°. On pin 32 is rotatably mounted the above mentioned roller 31 (Figs. 13, 14).

The said support 27 (Figs. 3, 15, 16) is made of a U section iron plate, in the hollow space of which are mounted two pulleys, the top one 19 (Fig. 16) receiving cable 12 (Fig. 4) from pulley 18 on the inclined girder and the bottom one 20 (Fig. 16) guiding said cable to pulley 21 (Fig. 3) fixed on the deck, from which it is wound on drum of winch 22 (Figs. 1, 3).

The top end of the support 27 is fork shaped and the girder is received between the fork arms 38 (Figs. 15, 16) which prevent any movement due to the pitching. Two rigid struts 39 (Figs. 4, 15, 16) fixed on the deck strengthen the support against strain from pull of cable 12. The support carries the cleat 28 (Figs. 4-16) on which is fixed the stop rope 26 as already described.

Half way between the two girders and on the edge of deck, is hinged the embarking gang-board 40 (Figs. 1, 2, 4, 17, 18). This consists of a rectangular board of convenient size, controlled by a frame 41 of lightened sheet iron, so shaped as to come to a stop on deck at an angle of 30° (Fig. 17), same as the girders by which it is controlled in the tipping over motion, by two small steel cables 42 (Figs. 2, 17, 18).

When the outboard tipping is completed, frame 41 remains vertical (Fig. 18) and holds the weight of the gang-board by means of two arms 43, which turn on the same pin as the frame, and are each guided by the guides 44 and 45 which act as stops, one of them being fixedly mounted on a strut fastened on the deck, and the other on the lower portion of the frame 41.

During the first portion of travel of frame 41, the guides 45 move, but not so arms 43. When the ends of these reach the bottom of guides, they are carried along, and stop only when they reach the top end of guides 44. Besides the steel cable 42 (Figs. 2, 26), between the support 41 and girders other steel cables 46 are stretched as a guard rail for passengers.

The gang-board is provided also with handrails 47 (Fig. 18) formed by rods pivoted with each other in the form of a parallelogram, so as to follow the movement of launch during the rolling of ship. The movement of the gang-board is limited to the position in which the two pieces forming each hanger 48 are in alignment.

A small hemp rope 49 passing through a hole on frame 41 serves to lower the gang-board on launch, and is provided with a diamond knot 50 which acts as a stop for the rope so as to provide for a certain amount of slack when said rope is hauled in for normal position, so that when the gang-board is tipped over with the girders, it assumes an initial inclination outboard, from which position it may be lowered onto the launch by its own weight. The cleat 51 fixed on one side of frame 41, serves to make fast the aforesaid hemp rope. If the gang-board should not fall spontaneously due to an unfavourable list of the ship, it could be pushed over by the boatmen who are the first to embark.

Each running block 13 (Fig. 5) has on top a transversal rod 68 which comes to bear against the head of davit when the lifting operation of launch is ended. Then commences the inboard swinging of davits.

The winch 22 (Figs. 1-3) for the winding of the hoisting cables, is provided with two parallel drums of equal diameter with a spiral groove cut therein to fit cables, revolving on brackets fixed on deck. The winch shall have a hand brake to regulate speed of drums when lowering the launch, and an electric motor for hoisting same. It must be possible to effect hoisting also by hand, in one of the known ways for working a winch both by hand and by means of an electric motor.

The automatic davits just described are operated by one person who has to effect the following operations.

To lower the launch:

(a) The operator loosens the stop ropes 26 (Fig. 3) or the like, which keep taut the lashings 24;

(b) He eases the winch brake; the davits carrying the launch, due to their inclination, will slide on the girders. At the end of their run, together with the girders they will tip over, until their outboard ends rest against the side of ship, or against a special frame which could be placed thereon.

Simultaneously the gang-board will have tipped over, and it will be brought to bear on the launch wash-board by paying out the rope 49 (Fig. 18); this can be done by one of the boatmen, who are the first to embark.

As soon as the tipping over movement is completed, brake is applied to the winch and the embarking of passengers takes place.

Immediately that this is finished, the cables are paid out until the launch, having reached the sea, is unhooked from the tackles.

To hoist launch:

(a) The launch is brought under the tackles and the suspension hooks, which must be in hooking condition, will be engaged with the running blocks;

(b) The electric winch is started; the launch is vertically lifted until the cross rods 68 of running blocks coact with the davits; these then tip inwardly until they come at rest on their supports 27 (Fig. 3). Meanwhile also the gang-board is tipped inwardly, and then the davits carrying the launch slide up the girders and as soon as they come to the end of their run the winch is stopped;

(c) Lashings 24 (Fig. 3) are passed round launch and made fast, when winch is made to unwind slightly to ease tension on falls and definitely stopped.

Should electric motor become unutilized, the launch shall be hoisted by hand, which naturally will be much slower work than when using the motor.

The device I have so far described, will naturally occupy space on the boat's deck. On liners this can be obviated, by having the whole device superelevated on the deck; the fulcrum of each girder instead of being placed on the edge of deck, will be of stanchions 69 (Figs. 19, 20) which will be of a convenient height to meet the special requirements.

In this case, the girders will rest on brackets 71 of the deck house 70 and on another central bracket, will be mounted the winch 22. Each lashing which will have to be hauled from the deck house, before being made fast to cleat 28 fixed on the bracket, shall pass on hook 72 on the davit in order that it may exert a downward pull.

When adopting this superelevated arrangement, the movable support which controls the gang-board, must also have its supporting uprights 73 superelevated (Figs. 19-21). The passengers, to reach the gang-board, will need climb a small ladder 74 fixed on the deck, and having, at its lower end, two uprights 75 which support the hand-rails 76 which are joined to those 47 of the gang-board.

The superelevated support 41 has two guide pins 77 at the sides which run in slots in uprights 73; these slots are of such a length as to act as stops to the pins in their travel from all inboard position of device, to all outboard.

In this embodiment of the invention, the guard rail 46, which in this instance is formed of rigid bars, will be fixed on edge of deck, and its height will be limited by the uprights of the girders and support, and will have intermediate stiffening stanchions 78.

This type of tipping over davits allows for the adoption of a device which, after the passengers have taken place in the launch, automatically causes another swinging movement of the davits in order to move away the launch from side of ship (Figs. 22-31). With this device, each girder 11 (Figs. 23, 25, 26) on which the associated davit slides, is hinged to the top end of an iron beam 79 the lower end of which is hinged to the edge of the lower deck 80 (Fig. 23). The beam 79 is formed by two pieces connected together in a spaced relation by suitable plates.

Upon slackening of the tackles for lowering the launch, the pieces 4 (Figs. 6, 22, 23) at the front ends of the davits, as soon as the tipping over movement is completed, come to rest against the ends of these beams, which, always due to the weight of launch, swing outward, getting the launch clear from side of ship, until the articulated arms 81 (Figs. 23, 24), which join said beams to the boat's deck, come into action.

Where the pieces 4 hit against the beams, a notch 82 (Fig. 25) is cut so as to prevent undue movement of davits. To further prevent any possible tipping inwards of davits, these are blocked in the notch by a hook 83 (Figs. 24, 25) moved by a parallelogram transmission placed on one side of iron beams.

This parallelogram transmission is controlled by a lever 84 (Fig. 15) on top side of same. When the iron beams are hard up against ship, this lever coacts with a bracket 55 mounted below the boat's deck; when the beams initiate their out and downward movement, the levers 84 come away from the relevant brackets 85 and leave their associated hooks free to lower and block the davits, owing to weight of parallelogram; this weight, if necessary, can be increased by a bar of lead fixed on the vertical piece 86 (Fig. 25) of the parallelogram.

Figure 33:
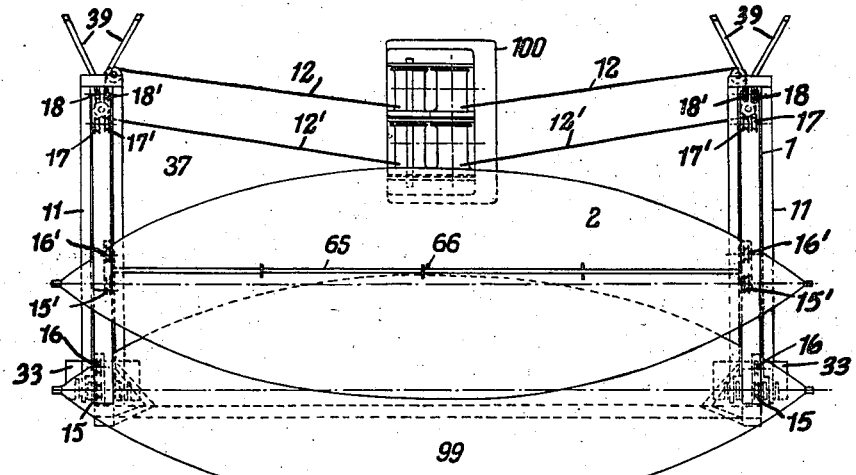
Fig. 33 shows the same davits looked at in the direction F33 of Fig. 32.

The top end connecting plate of each beam 79, carries a hook 87 (Figs. 23, 25, 27–29) which locks to, or frees from deck the iron beam by means of the following device: a metal plate 88 (Fig. 27) fork shaped in its front side, is fixed to the deck. When the iron beam is up, it fits exactly between the arms of the fork which holds it against any movement due to the pitching of ship. The plate 88 carries, in alignment with hook 87, a shackle 89 which, when in the dotted lines position on Fig. 33, engages the hook in the moment when lever 84 comes against bracket 85. Hook 87 comes even further in when the davit slides up its girder. In this second position, having first passed the stop rope 26 through the ring on lashing 24, the shackle is thrown inwards (position of full lines in Fig. 27) and hook 87 is blocked by a small lever 90, which is held in position by a circular segment moved by a lever 91.

With this type of automatic davits, the gangboard and its guide rails stay on board, whilst the davits, hinged on the iron beams 79, get clear from side of ship. For this purpose, the following device is provided.

The control rope of the movable support of the gang-board, and the ropes forming the guardrail, are stretched between each side of the support itself, and a special stanchion 92 (Fig. 26) reinforced by longitudinal and side struts, this last with a pin 93 (Figs. 24, 30) moving in a circular guide on the fixed base of the stanchion, and serves to stop the stanchion in its two extreme positions; vertical, and inclined at 30°, same as the guiding girders.

Each stanchion 92 is connected to girder 11 of the relevant davit by a projection 94 (Figs 22, 27, 30) on the girder which fits in a fork 95 movably mounted on the stanchion. This fork 95 (Figs. 22, 30) has a stem that slides in two lugs on said stanchion. The downward sliding is caused by gravity, and the upward sliding by means of a spade shaped lever 96 fulcrumed on the cross strut of the stanchion. The stem's lower end is provided with a perpendicular extension 97 which during the tipping over movement of the stanchion, slides on the circular segment 98 (Figs. 30, 31) on the base of same. This segment is so shaped as to allow for the falling down of the fork when the stanchion assumes a perpendicular position with respect to the deck. The end of extension 97 comes against the external side of segment 98 (Fig. 30), blocking the associated stanchion against inward movements. At the same time the girders are freed from the stanchions for the outboard swing together with the iron beams, as soon as stop levers 90 (Fig. 35) are removed. The stanchions remain, as stated above, blocked on board with all the gang-board device, with which they are always connected.

The davits I am now considering have each, between the two pulleys 15 and 16 for the hoisting cable, a third pulley, whose object is to keep clear the tackle even in the most protruding position of davits.

The davits are operated by one person only in the following way:

To lower the launch at sea:

(a) The lashings 24 (Fig. 3) are slipped and the launch is then free to descend;

(b) The winch brake is eased; the davits carrying the launch slide on guides; at the end of their run, they tip over until their members 4 are received in notches 82 (Figs. 23, 25) on iron beams; simultaneously the stanchions 92 (Figs. 22, 24) tip over with the frame shaped support of the gang-board, and this last is slipped on the launch by means of the hemp rope 49 (Fig. 18). The girders 11 are automatically disconnected from their respective stanchions 92 as the forks 95 (Figs. 30, 31) have already descended by gravity, blocking simultaneously the stanchions to their uprights and therefore to the ship. Now the brake is applied to the winch to allow the passengers to embark, whilst the operator swings the levers 91 (Figs. 27, 28) to free the blocking members 90 that hold the beams to the deck. All the passengers having embarked, lowering away is resumed and the rotation of beams commences (Fig. 23), which clears the launch from side of ship until arms 81 come into action (Fig. 24). The launch then reaches the surface of the water. At the commencement of this second phase, the davits are stopped in the notches 82 on the iron beams by the hooks 83. The unhooking of launch happens automatically or by hand, as said before.

To hoist launch:

(a) The launch is brought under the falls: the hooks are hooked to the running blocks; on board the gang-board is lifted if necessary.

(b) The winch is started and launch is hoisted; when the cross rods 68 (Fig. 5) of running blocks come up against the davits, the iron beams 79 rotate towards ship, until they come up against edge of boat deck; simultaneously the lever pieces 84 (Fig. 23) coact with brackets 85 (Figs. 23, 25) lifting the hooks 83 which free the davits for their inboard tipping. As soon as each lever 84 has come up against bracket 85, the shackle 89 which has previously been turned outwards, comes into action engaging hook 87 and blocking the iron beams so as to prevent them tipping outwards through rolling of ship. The winch is stopped, and by means of the spade shaped lever 96 (Fig. 30) the fork 95 is lifted so that it engages the projection on the girder (Figs. 26, 30) with which the stanchion must be tipped inboard. The spade shaped lever is stopped by a pin.

Keeping the winch hoisting, the davits tip inboard till they come to rest on their supports 27 (Fig. 3); lashings 24 are then passed under the launch and made fast by their stop ropes 26.

In this phase of movement, the girders have dragged with them the stanchions and therefore the frame or support of the gang-board, which will take its position of rest.

Figure 34:
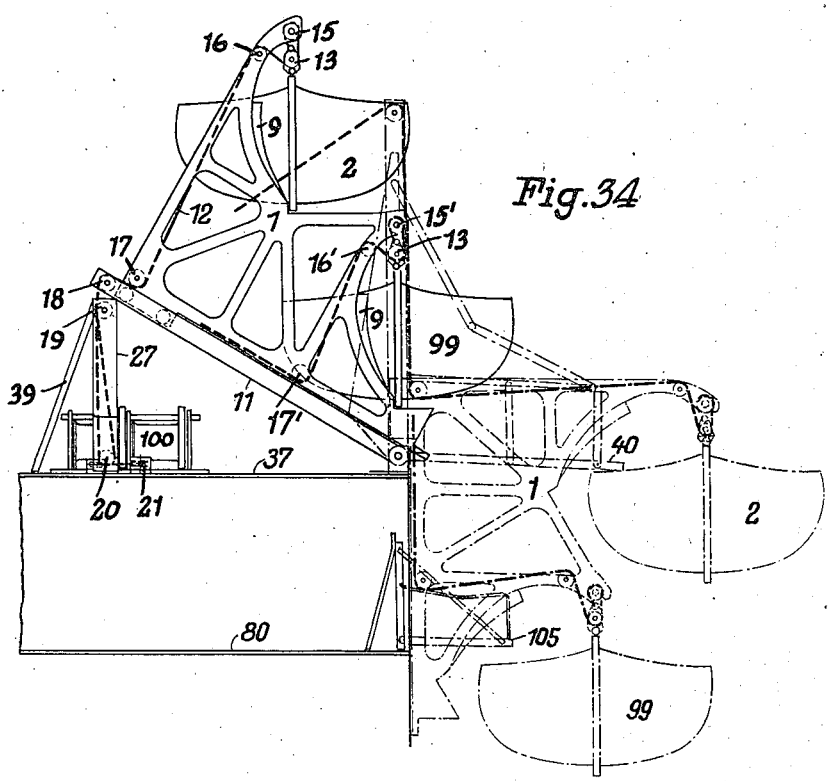
Fig. 34 shows in full lines the same davits looked at in the direction F34 of Fig. 32, the dotted lines showing the davits in their outward position.

The automatic davits according to the invention may be so made as to be available for two launches 2 and 99 respectively (Figs. 32, 33, 34), which are swung simultaneously outboard and lowered at sea one after the other, only one operator being necessary for the job.

Figure 35:
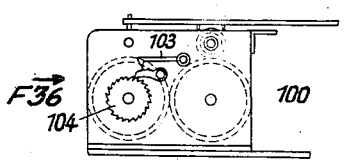
Fig. 35 is an end view of the winch for the two boat davits.
Figure 37:
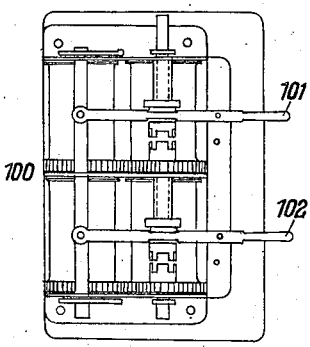
Fig. 37 is a plan view of the same.

This is obtained by building the davits with two arms and double set of tackles, the hoisting cables being wound separately over two couples of drums of equal diameter, belonging to the same winch 100 (Figs. 35, 37). The plates which form each davit 1 (Fig. 4) are at a double distance than in the other types of davits according to the invention, so as to have a good stability notwithstanding the greater height, and to lodge the pulleys for the tackles of the launches (Figs. 32, 33); the guides that form each girder 11 are correspondingly spaced apart, and the supports 27 (Fig. 34) are of double width.

The two couples of winch drums for the two launches, are provided each with a clutch and a stopping device, so that the two couples of drums can revolve together or separately. The clutch of the couple of drums relating to the upper launch is operated by a lever 101, and the other couple of drums by a lever 102 (Fig. 37).

Figure 36:
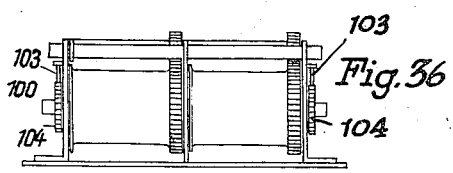
Fig. 36 is a view of the said winch looked at in the direction F36 of Fig. 35.

The blocking device for each couple of drums comprises a pawl 103 (Fig. 35) mounted on the winch frame and a ratchet-wheel 104 fixed to the shaft of one of the drums. The other features of the davits for two launches are the same as described in connection with the first embodiment of the invention with the only difference that, besides the automatic gang-board 40 (Fig. 36) being made longer owing to the greater distance of the upper launch from boats deck 37, and that is needed for embarking passengers from this deck into the upper launch, there is a second gang-board 105 manually operated by the sailors of the lower launch and serving for embarking in this launch the passengers from the promenade deck 80.

The double arm davits for two launches work as follows (one person only always needed).

To lower launches:

(a) Keeping coupled the winch drums on which are wound the cables of both launches, the lashings having been loosened, the winch brake is eased: the davits will now slide on guides and top over as usual.

On the upper launch 2, which is now at the level of the boats deck, the gang-board 40 (Fig. 34) automatically falls, whilst on the lower launch 99, which is now at the level of the promenade deck, the boatmen lower the other non-automatic gang-board 105. Brake is then applied to the winch.

From both decks passengers are simultaneously embarked, whilst the winch operator uncouples by means of lever 101 (Fig. 37) the set of drums working the upper launch, and blocks them by means of the relevant pawl 103. He then eases the brake on winch to lower at sea the inferior launch, after which he again applies brake to the winch, and, by means of lever 102, uncouples the drums of the launch that has been lowered, and blocks them by means of the relevant pawl 103, and operating lever 101 couples the other set.

As soon as the lower launch has sailed away, he eases the brake to lower the upper launch.

To hoist launches, the whole operation is inverted.

To lower one launch only, the way of proceeding is identical, the inferior launch being lowered.

With this type of davits for two launches, the stress on cables is the same, because the two couples of cables concur simultaneously to the working of davits; the winch alone must be more powerful than the one for one launch only, as the power needed for the inboard tipping of davits, and for their sliding up the guides, is increased by the weight of the second launch and by the greater sizes of davits.

Although some embodiments of this invention have been described in detail, this has been done by way of example only, as in practice various modifications may be adopted without departing from the scope of the invention.

What I claim is:

1. A device for launching boats from a vessel comprising a track extending to the ships side, supports for said track, the inner support extending further from the deck of the ship than the outer support whereby the track is downwardly inclined outboard, the track being pivoted to a fixed point of the outer support and resting freely on the inner support, a davit slidably mounted on said support and means for retaining said davit in its inboard position, whereby upon release of said retaining means the davit will slide outboard on the track and the track will revolve on its pivot to a vertical position.

2. In a device for launching boats from a vessel, a pair of davits, a track girder for each of said davits, means for supporting said track-girders at a substantial inclination downwardly toward the vessels side to which means said track girder is pivotally attached at a fixed point at its outer end its inner end resting freely on the supporting means, each of said davits having a base slidably secured to said track-girder and an arm perpendicular to said base, means for suspending a boat from the free end of said arm, and means for confining said davit to the inner end of the track girder whereby when said last named means is released the davits automatically slide over the track girder and the track girder revolves to a vertical position.

3. Automatic device for launching boats from the side of a vessel comprising, two pairs of supports, one support of each pair being hinged to the edge of the deck of the vessel and a fixed support of the same pair extending further above the deck, a girder pivoted to each of the hinged supports and resting on the other support of the same pair, stop means preventing the girder from passing beyond alignment with the support to which it is pivoted, a davit having a base slidably mounted on the track girder, stop means for said base at the outer end of each of said track-girders, each of said davits having an arm perpendicular to its base, a cable fixed to the end of said last named arm, a running pulley and guide pulleys on said last named arm, said girder and said fixed support through which said cable passes in the order named, folding means for said cable and stop links limiting the outward movement of the hinged support whereby on the release of the cable the davit will slide down the girder and owing to the new position of the centre of gravity the girder track will revolve outwardly on its pivot into alinement with the pivoted support and then the pivoted support and girder as a unit will swing outward until held by the stop links.

4. The device as claimed in claim 3, wherein a gang-board is hingedly supported, a frame carrying said gang board and means connecting said frame to the track girders to move therewith.

5. The device as claimed in claim 1, in which the davits have two pairs of rollers journaled in the inboard end of their base, and a roller mounted on the pivot of each track girder on which the davits bear.

6. The device as claimed in claim 1, in which a bar of generally triangular cross section and having one edge chamfered in the middle portion is attached at each end to one of the davits thereby steadying the davits while facilitating the sliding of the boat when the ship has a list to the opposite side.

7. In the device as claimed in claim 1, a steel cable connecting the track girders at the top, a gangboard and a frame therefor, fixed to said cable, a pivot shaft attached to the deck, on which said gang board and frame swing, stops on said frame to limit its movement to the range between a 30° inclination to the deck and perpendicular to the deck, a system of pivoted rods connecting the gang board to the frame and forming a hand rail.

8. The device as claimed in claim 3, in which midway between the davits a gang board and a frame therefor are pivotally attached to the vessel, a stanchion detachably connected to the inboard end of each girder, a steel cable supporting the gang board frame connecting said stanchion, and means for releasing each stanchion from its girder when the girder comes into vertical alignment with its pivoted support.

9. In a device for launching boats from a vessel, inboard and outboard supports, girders pivotally mounted at fixed points on said outboard supports, and resting on said inboard supports to have an outboard inclination of substantially 30° to the deck of the vessel, davits mounted slidably on said girders and extending at right angles thereto, cables for suspending a boat from said davits, pulleys through which said cables pass on the davit, the girder and the inboard supports, means for winding the cable and for releasing the same, whereby on release of the winding means the davit will slide to the outboard end of the girder and the girder will swing on its pivot to a position at right angles to the deck.

10. The device as claimed in claim 1 in which the outboard support is pivoted to the deck, a stop holding the girder in alinement with the support when it reaches that position whereby the support and girder will swing outboard as a unit and means limiting said movement of said outboard support.

11. In the device as claimed in claim 1, a gang board and means for automatically swinging said gang board into operation when the davit is swung outboard.

12. Automatic device for launching boats from a vessel, comprising a vertical support having its lower end secured to the deck, a girder having its inboard end resting on the support and its outboard end pivotally secured to said deck at a fixed point, said girder being inclined substantially 30° to the deck, a davit having one arm slidably supported on said girder and a second arm perpendicular thereto, pulleys on the arms of the davit, on the girder and on the vertical support, a free pulley having a cable attached thereto running on said pulleys in the order named, a winch to which said cable is attached, means acting as a stop to said davit in its sliding movement and means acting as a stop to said girder when it reaches a vertical position.

ANTONINO PAMPINELLA.